Figure 1:
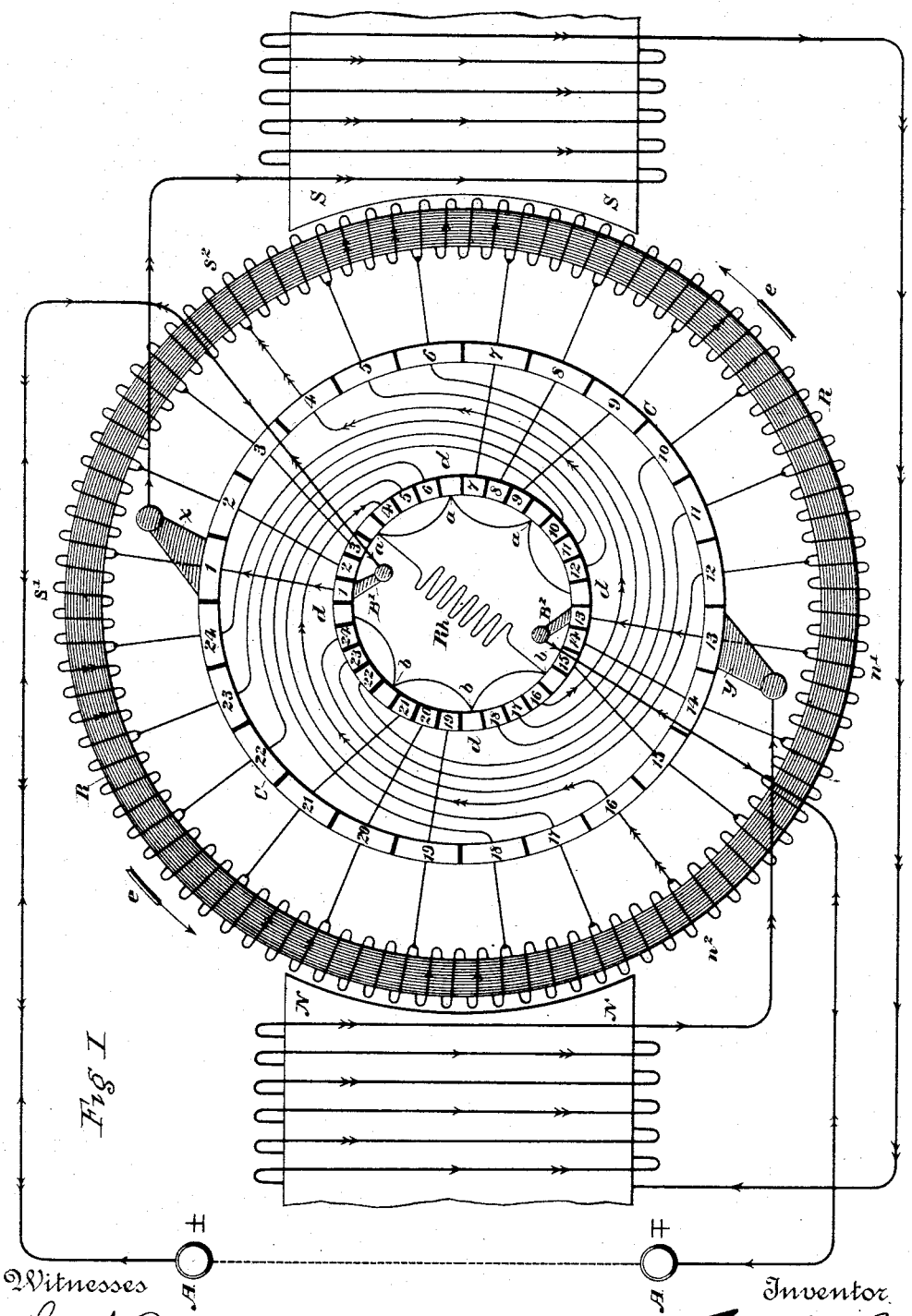

(No Model.)

F. J. PATTEN.
ELECTRIC MOTOR.

No. 413,085. Patented Oct. 15, 1889.

Witnesses
Geo. W. Breck.
C. E. Ashley

Inventor
Francis Jarvis Patten
By his Attorney

UNITED STATES PATENT OFFICE.

FRANCIS JARVIS PATTEN, OF NEW YORK, N. Y.

ELECTRIC MOTOR.

SPECIFICATION forming part of Letters Patent No. 413,085, dated October 15, 1889.

Application filed August 21, 1889. Serial No. 321,536. (No model.)

*To all whom it may concern:*

Be it known that I, FRANCIS JARVIS PATTEN, a citizen of the United States, residing at New York, in the county and State of New York, have invented certain new and useful Improvements in Electric Motors, of which the following is a description.

My invention consists, mainly, in a novel system of armature-connections designed to secure results not otherwise obtainable, producing by such connections a self-starting alternating-current motor.

In a former application, Serial No. 316,894, filed July 8, 1889, I have shown the general features of the system of which the present invention forms a modification.

The system as here described is designed to affect the speed of the machine in such a way that the motor will have the same speed when connected in an alternating-current circuit that it would normally have when connected in a direct-current circuit. There are also other modifications shown, which will be explained later.

The figure represents the operative parts and circuits of any form of motor the armature-circuits of which are connected in multiple arc between the brushes. It may therefore be either a machine of the Gramme-ring type or cylinder-winding, and is an ordinary two-pole machine with the armature connected in the ordinary way to a segmental commutator, the segments of this commutator being connected to those of a brush-changer in the same general way as described in my former application.

In the figure, N N S S are the field-poles of such a machine. R R is an ordinary Gramme ring revolving in this field.

C C is an ordinary commutator, the twenty-four successive segments of which are connected in the ordinary way to the twenty-four corresponding points of the ring-winding. $x$ and $y$ are ordinary brushes bearing upon this commutator.

$d\ d$ is another segmental commutator attached to the same spindle and shown inside the first, simply to avoid confusion of the drawing and circuit connections. This commutator is termed a "brush-changer" to distinguish it from the first, and for reasons explained in my former application. Two brushes $B'$ and $B^2$ bear upon this brush-changer, and are connected through the mains to the terminals of a source of alternating current indicated at A A.

The ordinary commutator C C has twenty-four segments. The brush-changer $d\ d$ has thirty-two segments. Twenty-four of these are live segments and eight of them are blanks or insulating-spaces, the purpose of which will be hereinafter described. In both commutators the live segments are numbered consecutively from the top, around in the directions of the motion of the hands of a clock, from 1 to 24. The segments of the brush-changer $d\ d$ are connected to the segments of the commutator in groups. The first three are connected direct segment for segment, and the succeeding three are connected inversely, not to the corresponding points of the commutator, as before, but to points diametrically opposite. Thus segments 1, 2, and 3 of the brush-changer are connected directly to corresponding segments 1, 2, and 3 of the commutator; but segments 4, 5, and 6 of the brush-changer are connected to the diametrically-opposite segments 16, 17, and 18 of the commutator. Segments 7, 8, and 9 of the brush-changer are then again connected direct to 7, 8, and 9 of the commutator, and 10, 11, and 12 of the brush-changer are connected inversely to the diametrically-opposite segments 22, 23, and 24 of the commutator, and so on around the ring, from which it results that every alternate group of segments in one is connected direct to the corresponding segments in the other commutator, while the remaining group in one commutator is connected to a corresponding group diametrically opposite to it in the other.

The alternating-current mains are led to the brushes $B'$ and $B^2$, and the current proceeds from these brushes through the connections described to the regular commutator C C. The single arrows represent the direction of an impulse of current, which we will call the "first one," and which may be considered positive. The double arrows represent the succeeding reverse current, or a negative impulse. If in the position shown a positive impulse arrives through the brushes $B'\ B^2$, it will flow direct to the corresponding segments in the commutator C C, and, entering the ring at $s'$, will flow down the sides to the right and left, making a south pole at S and a north pole at $n$ in the ring. From the brushes $x$ and $y$ this impulse will also flow through the field-circuit, producing the poles, as indicated, S S and N N. These conditions will induce motion in the direction of the arrows $e\ e$.

If the motor starts at its normal speed, we may assume that the segments 1, 2, and 3 will pass under the brush $x$ under the action of this single positive impulse, which is the normal condition of the machine; but if this does not take place and the current is reversed while the brush is still on one of these segments, then, it will be seen, by tracing the circuits, that the polarity of the ring will be reversed; but as the field-circuits will also be reversed the tendency to motion will still exist, and the effort will be to turn the armature in the same direction, as indicated by the arrows $e\ e$. The machine will therefore start at all events and its direction of motion, whether acting as a direct-current or as an alternating-current motor, will always be the same. By so connecting the armature that the speed as an alternating machine, when moving synchronously, will be slightly less than when moving normally, as a direct-current machine, then the motor will start itself as a direct-current machine, and when having gained the speed required to move synchronously as an alternating machine it will automatically continue as an alternator, and under this condition of things we may, therefore, assume that during a positive impulse segments 1, 2, and 3 will pass under the brushes, and during the succeeding negative impulse segments 4, 5, and 6 will pass under the brushes, and so on in rotation, each impulse of current, positive or negative, corresponding to the motion required for one group of segments to pass under the brushes. Assuming this to be the case, the operativeness of the machine as an alternating-current motor will be readily understood. Thus in the position shown, with the positive impulse flowing from the source A A in the direction of the single arrows, field and armature polarity, as indicated, will be produced, and motion will ensue, as indicated by the arrows $e\ e$. At the period of zero potential or change the brushes B′ and B² will rest upon the blank segments $a\ a\ b\ b$, connected to the resistance R$h$, the purpose of which is to prevent an absolute rupture of the alternating-current circuit at any time, and so reduce the sparking, as well as to prevent bridging and the short circuits that might otherwise take place.

As the brushes B′ B² come respectively upon segments 4 and 16, a reverse or negative impulse comes from the source A A. Its direction is indicated by the double arrows, and as it is opposite to the former in direction it may be regarded as entering at the brush B², resting now upon segment 16, while the brush B′ is upon segment 4, and the two brushes $x$ and $y$ will bear upon 4 and 16 also of the regular commutator. Under this condition of things, considering the current entering at B², it goes to segment 16, and by the reverse connection shown it goes to segment 4 of the regular commutator into the ring at $s^2$, where, dividing, it goes around the ring on both sides to $n^2$, thence to segment 16 of the regular commutator, then by the reverse connection to segment 4 of the brush-changer, out of the brush B′, and back to the source at A. This impulse evidently produces the same polarity in the ring as before, the south pole at $s^2$, the north pole at $n^2$, both of which will be at the time upon a vertical line across the field. The direction of current through the ring is therefore the same with both impulses, plus or minus; but the brushes $x$ and $y$ will then be bearing upon segments 4 and 16 of the commutator, and the direction of current flow through the field will still be the same as before, maintaining all the polarities of the machine, precisely the same as with a direct current. Motion will therefore be continuous and in one direction.

It will be observed that if we trace the alternating current in its successive phases the reversed impulses will always flow in the same direction through both the ring-winding and the field-circuits, and the machine would therefore operate as an ordinary direct-current motor, though connected in an alternating-current circuit.

The resistance R$h$ has its terminals connected, one end to the blank segments $a\ a\ a$ of the brush-changer, the other end to the blank segments $b\ b$ of the same. This resistance is designed simply to afford a path for the current, such as there may be at the period of change of the brushes from a group of segments that take a positive current to a group that take negative current, and avoid destructive sparking at this point. The blank segments also prevent the alternating brushes B′ B² from bridging successive groups of segments, which would produce a dangerous short circuit of the machine. Evidently, therefore, these blank segments should be slightly wider than the brush-contact, and the alternating commutator or brush-changer will generally be made larger than the ordinary armature commutator or collector.

Having thus described my invention, what I claim as new is—

1. An electric motor having an armature provided with a commutator or collector in which adjacent groups of bars are connected with the armature-winding at points respectively contiguous to and opposite to the said adjacent groups of segments in rotation around the ring.

2. An electric motor provided with two commutators or collectors, one having its bars or segments connected to successive points of the armature-winding in rotation, the other set having adjacent groups of bars connected alternately to segments of the first commutator, and through the latter to points of the ring-winding which lie respectively contiguous to and opposite to the said adjacent groups of bars in rotation around the ring.

3. An electric motor having an armature provided with two collectors or commutators and two pairs of brushes, one collector or commutator having its bars or segments connected in rotation to successive points of the ring-winding, and the brushes bearing on these connected to the field-circuit, the adjacent groups of bars of the other collector being connected in succession to points of the ring-winding respectively contiguous to and opposite to the said adjacent groups of segments in rotation around the ring, and the brushes bearing on this collector or commutator connected to a source of alternating current.

In testimony that I claim the foregoing as my invention I have hereunto set my hand, in the presence of two witnesses, this 21st day of August, 1889.

FRANCIS JARVIS PATTEN.

Witnesses:
ROBT. H. READ,
G. H. PENFIELD.